June 1, 1937. G. P. SLATER 2,082,663
SLIDING REACH AND SLEEVE FOR TRUCK BEDS
Filed Feb. 24, 1936 2 Sheets-Sheet 1
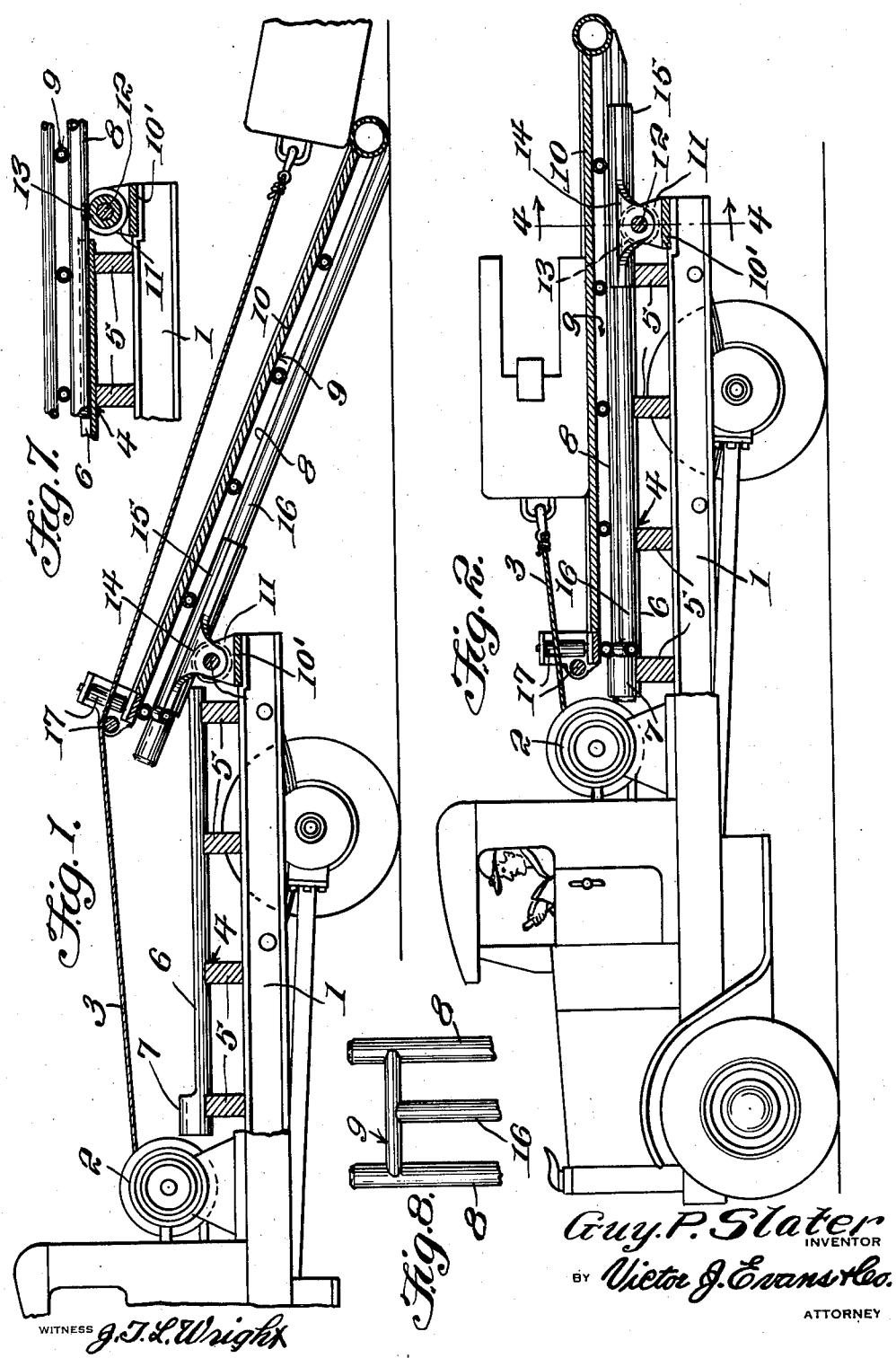
Guy P. Slater
INVENTOR
BY Victor J. Evans & Co.
ATTORNEY
WITNESS J. T. L. Wright June 1, 1937. G. P. SLATER 2,082,663
SLIDING REACH AND SLEEVE FOR TRUCK BEDS
Filed Feb. 24, 1936 2 Sheets-Sheet 2
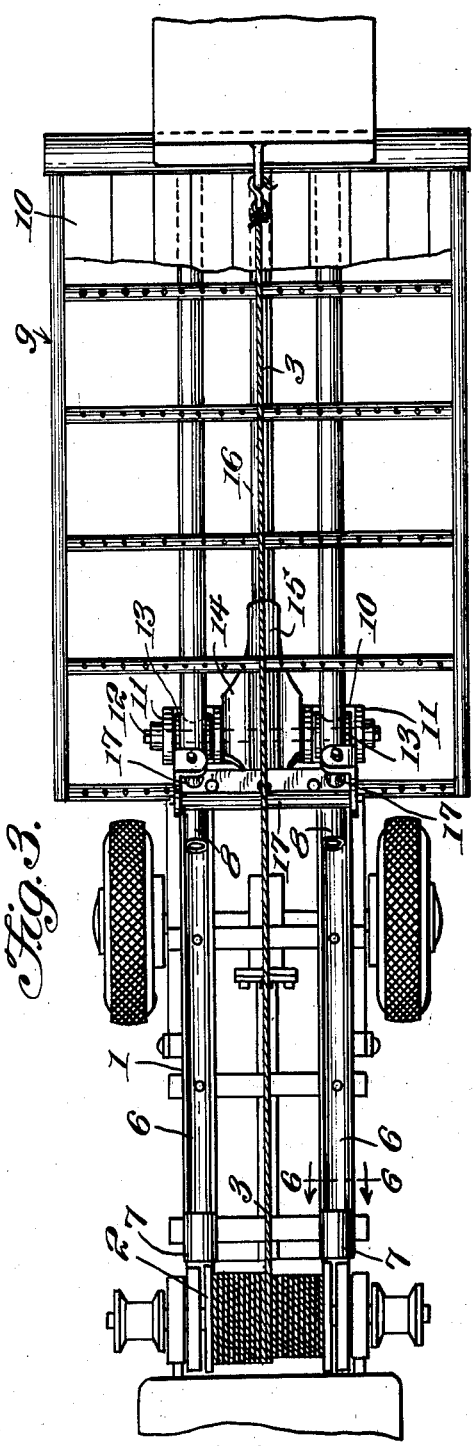

Patented June 1, 1937

2,082,663

UNITED STATES PATENT OFFICE 2,082,663

SLIDING REACH AND SLEEVE FOR TRUCK BEDS

Guy P. Slater, Sand Springs, Okla.

Application February 24, 1936, Serial No. 65,476

2 Claims. (Cl. 214—85)

This invention relates to a sliding reach and mounting for a slidable truck bed and has for the primary object the provision of a device of this character which will permit a sliding bed to move with ease to its different positions, either from loading or unloading position to load carrying position, and will limit the movement of the bed beyond said positions, and thereby obviate the possibility of the bed becoming accidentally disconnected from the truck chassis and accidents incident thereto.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a slidable truck bed attached to a truck chassis embodying my invention and showing the bed positioned for loading.

Figure 2 is a side elevation, partly in section, showing the bed in load carrying position.

Figure 3 is a top plan view illustrating the device.

Figure 4 is a sectional view taken on the line 4—4 of Figure 2.

Figure 5 is a fragmentary plan view showing the bed runners supported by the mounting.

Figure 6 is a sectional view taken on the line 6—6 of Figure 3.

Figure 7 is a fragmentary sectional view showing the bed runners engaging the mounting.

Figure 8 is a fragmentary plan view showing the ends of the runners at one end of the bed.

Referring in detail to the drawings, the numeral 1 indicates a truck chassis on which is mounted a winch 2 and its cable 3. Also mounted on the chassis 1 is a fixed bed 4 consisting of beams 5, secured to and extending transversely of the chassis and which supports trough-like guides 6 arranged longitudinally of the chassis and have their forward ends terminating in sleeves 7. The guides 6 extend from a point adjacent the winch to a point adjacent the rear end of the chassis and slidably receive runners 8 forming a part of a movable bed 9. The bed 9 includes a frame of substantially rectangular shape in which the cross members thereof have the tracks secured thereto and also flooring 10. The movable bed 9 is adapted to be slid from the position shown in Figure 2 to the position, as shown in Figure 1, so that a heavy load may be moved off of the ground onto said movable bed by the winch and then the load and the movable bed moved into load carrying position upon the chassis, as shown in Figure 2. A bed of this character eliminates the use of skids for unloading and loading trucks and permits loads of heavy weight to be conveniently and easily handled. A sliding bed of the character described has been employed for the purpose stated with no provision for preventing the movable bed 9 from becoming accidentally disconnected from the truck chassis when in loading or unloading position and in some instances during the loading or unloading operation the bed has accidentally become disconnected from the chassis, endangering the device being loaded or unloaded and to obviate this danger my invention is employed and consists of a bracket 10 secured to the chassis 1 at the rear ends of the guides 6 and includes spaced upright portions 11 forming journals for a shaft 12. Rollers 13 are carried by the shaft preferably of the grooved type and receive the tracks 8 as they leave the guides 6. A yoke 14 is journaled on the shaft 12 between the rollers 13 and is integral with a sleeve 15 which slidably receives a reach pole 16 extending longitudinally of the movable bed 9 and has its ends secured thereto. The sleeve 15 and reach pole 16 permit a free sliding movement of the movable bed 9 into its several positions, as the movable bed 9 is prevented from moving beyond said position by the ends of the reach pole being secured to the movable bed and contacting the ends of the sleeve. This arrangement will prevent the movable bed from becoming accidentally disconnected from the chassis when in loading or unloading position.

The forward ends of the tracks enter the sleeves 7 to secure the movable bed against any possibility of tilting in an endwise direction when in load carrying position, as shown in Figure 2.

Vertical and horizontal rollers 17 are carried by the forward end of the movable bed and through which is trained the cable 3 acting to center the cable when passing over the movable bed.

Having described the invention, I claim:

1. In combination with a motor vehicle chassis and a movable bed slidably mounted on said chassis and having tracks, a bracket secured to the chassis, rollers carried by said bracket to engage the tracks, a reach pole secured to said bed, and a sleeve secured to said bracket and slidably receiving the reach pole and co-operating therewith in limiting the movement of the bed relative to the chassis to prevent accidental detachment of the bed from the chassis.

2. In combination with a motor vehicle chassis and a movable bed slidably mounted on said chassis and having tracks, a bracket secured to the chassis, rollers carried by said bracket to engage the tracks, a reach pole secured to said bed, a sleeve secured to said bracket and slidably receiving the reach pole and cooperating therewith in limiting the movement of the bed relative to the chassis to prevent accidental detachment of the bed from the chassis, and guide rollers carried by the bed for guiding the movement of a winch cable over said bed.

GUY P. SLATER.